Patented May 7, 1935

2,000,596

UNITED STATES PATENT OFFICE 2,000,596

PREPARATION OF LACTYL CELLULOSE ESTERS

William O. Kenyon and Russel H. Van Dyke, Rochester, N. Y., assignors to Eastman Kodak Company, Rochester, N. Y., a corporation of New York No Drawing. Application December 14, 1932, Serial No. 647,213

3 Claims. (Cl. 260—101)

The present invention relates to the preparation of cellulose esters in which a cellulose ester containing both the groups of a fatty acid and an alpha-hydroxy acid is subjected to further esterification in a non-hydrolyzing bath.

The preparation of the organic acid esters of cellulose has within recent years come into considerable importance, until at the present time the representative of this type of ester, cellulose acetate, has taken its place along side of cellulose nitrate in the cellulose derivative field. The organic acid esters of cellulose other than the acetate have not however become used commercially to any great extent. It has been known to employ cellulose acetate-lactate as the starting material for esterification in a bath consisting of an acid having an ionization constant considerably more than that of acetic acid so that those groups are partially or even wholly replaced from the material originally employed. It appears that in that process there was more or less hydrolysis also as the final product was water soluble and that the reaction involved mainly the replacement of some of the acetyl groups by groups from the acid having the higher ionization constant. The present invention however due to the presence of acid anhydrides or chlorides avoids any hydrolysis and the ester resulting therefrom approaches full esterification. The present invention is concerned also with the esterification of the hydroxyl groups both of the cellulose and of the hydroxy acid radical which obviously would be difficult or impossible of attainment in a reaction bath having hydrolyzing tendencies.

One object of the present invention is to prepare cellulose esters containing groups other than acetyl which esters present wide solubilities and properties differing from the properties of commercial cellulose acetate. Another object of our invention is to prepare cellulose esters containing alpha hydroxy acid groups which approach full esterification. A further object of our invention is to provide a process of preparing cellulose esters containing lactyl groups in which it appears that the hydroxyls of the alpha hydroxy acid groups are esterified either partially or wholly in the process.

We have found that a cellulose ester containing alpha hydroxy acid groups such as a cellulose acetate lactate containing free and available hydroxyl groups may be converted into an ester which is almost completely esterified and which exhibits solubilities in many of the common and more economical organic solvents. We have found that the water solubility of the usual cellulose acetate lactate is eliminated by our process and solubility in most of the organic solvents commonly employed for celloidizing is induced thereby. We have found that the cellulose esters containing fatty acid and alpha hydroxy acid groups appear to be susceptible to esterification not only in case of the hydroxyl groups of the cellulose portion but also the hydroxyl groups of the lactyl groups. We have found that the esters in which the hydroxyls of the alpha hydroxy acid group are esterified differ decidedly in solubility from those esters in which the hydroxyls on that acid group are not esterified.

Our process comprises esterifying a cellulose ester containing fatty acid and alpha hydroxy acid groups, preferably of the water soluble variety, by treating it with an organic acid anhydride or an organic acid chloride and a catalyst.

The following examples illustrate the application of our invention to the preparation of esters in which cellulose acetate lactate is employed as the starting material. The cellulose acetate lactate employed had an apparent acetyl content of 22.4% and was soluble in water, pyridine, hot ethyl alcohol (75%), dilute aqueous sodium hydroxide, aqueous sodium bicarbonate and dilute ammonia and was insoluble in all the common organic solvents for cellulose esters such as acetone, chloroform, etc.

Example I 10 gms. of cellulose acetate lactate was dissolved in 40 cc. of pyridine. 20 grams of phthalic anhydride was added to this solution and the whole was heated at about 50–55° C. After 24 hours at this temperature the reaction mixture was thinned by diluting in acetone and was then precipitated by pouring it into hot water. It was then washed with water and finally with benzene to remove any phthalic anhydride that might be present. The resulting ester, cellulose acetate lactate phthalate, was found to have an apparent acetyl content of about 35.8%, a lactyl content of 7.1% and phthalyl content of approximately 54%. It was soluble in ethylene chloride-methyl alcohol (65:35), 75% ethyl alcohol, methyl alcohol-acetone (1:1), dilute aqueous NaOH, aqueous sodium bicarbonate, aqueous ammonia, benzene-methyl alcohol (1:1) and toluene-methyl alcohol (1:1). It was found to be insoluble in water, pyridine, acetone, chloroform, chloroform-alcohol (85:15), carbon tetrachloride, ethylene chloride, propylene chloride, methyl alcohol, ethyl alcohol (95%), ethyl acetate, butyl acetate, ethyl lactate, ethyl ether, isopropyl ether, cyclohexanol, cyclohexanone, methyl cellosolve, ethyl cellosolve, 1:4 dioxan, benzene and toluene.

Example II 10 gms. of cellulose acetate lactate was dissolved in 40 c. c. of pyridine and 25 gms. of succinic anhydride was added thereto. The whole was heated for about 24 hours at 50-55° C. after which the solution was precipitated by pouring into water accompanied by stirring. The ester which precipitated (cellulose acetate lactate succinate) was washed and dried and was found to be soluble in ethylene chloride-methyl alcohol (65:35), benzene-methyl alcohol (1:1), toluene-methyl alcohol (1:1) dilute sodium hydroxide, aqueous sodium bicarbonate and aqueous ammonia. The ester was found to be insoluble in water. It was found upon analysis to have an approximate content of 50.8% apparent acetyl, 12% lactyl and 51% succinyl.

Example III 10 gms. of cellulose acetate lactate was mixed with 50 c. c. of glacial acetic acid. A solution of 0.1 gm. of magnesium perchlorate trihydrate dissolved in 10 c. c. of glacial acetic acid and 19 c. c. of 93% acetic anhydride was added thereto and the whole was maintained for about 23 hrs. at 50-55° C. The reaction mixture, which was a homogeneous solution, was precipitated in water, washed and dried. The resulting ester, cellulose acetate lactate acetate, had an apparent acetyl content of 44.7% and was soluble in acetone, chloroform, ethylene chloride, chloroform-alcohol (85:15), ethylene chloride-methyl alcohol (65:35), ethyl acetate, ethyl lactate, cyclohexanone, methyl cellosolve, 1:4 dioxan, benzene-methyl alcohol (1:1, 2:1), toluene-methyl alcohol (1:1, 2:1), methyl alcohol-acetone (1:1), pyridine, hot 75% ethyl alcohol.

Example IV 10 gms. of cellulose acetate lactate was dissolved in 40 c. c. of pyridine. 25 gms. of benzoic anhydride was added thereto and the whole was maintained at a temperature of 50-55° C. for 6 hours. The product was precipitated in ethyl alcohol and was then washed to neutrality first with alcohol and finally with water. The resulting ester, cellulose acetate lactate benzoate, had an apparent acetyl content of approximately 28.5%, a lactyl content of approximately 7.8% and was soluble in acetone, chloroform-alcohol (85:15) ethylene chloride-methyl alcohol (65:35), ethyl lactate, methyl cellosolve, ethyl cellosolve, 1:4 dioxan, benzene-methyl alcohol (2:1) and pyridine.

As pointed out previously other aliphatic alpha hydroxy acid groups than lactyl may be present in the starting material either in addition to or instead of lactyl groups. Some of the alpha hydroxy acids which may contribute groups to the starting material of the present invention are tartaric, racemic, malic, glycollic and glyceric. The preparation of esters such as may be employed as the starting material in the present invention is disclosed in various places such as in the U. S. Patent of Webber and Staud No. 1,861,200, Staud and Webber application Serial No. 341,032, now Patent No. 1,957,856, May 8, 1934, which discloses and claims the preparation of these esters by reacting upon cellulose acetate with the alpha-hydroxy acid preferably at 100° C. and Van Dyke, Staud and Kenyon application Serial No. 623,023, filed July 16, 1932, which discloses and claims the preparation of these esters by reacting upon the cellulose acetate with the alpha hydroxy acid and a catalyst such as zinc chloride. Obviously other fatty acid groups especially of the lower acids such as propionyl or butyryl could be present instead of or in addition to the cellulose esters employed as the starting material.

The esterifying baths used as illustrations in the above examples are intended to be representative of the usual types of non-hydrolyzing esterification baths which are made up essentially of either an acid anhydride or an acid chloride (or both if desired) and a catalyst. Obviously the particular esterifying agent selected may depend on the wishes of the individual operator and the acyl groups which it is desired to introduce into the cellulose ester.

If our present invention is carried out using cellulose acetate lactate as the starting material and acetic anhydride, the reaction that takes place appears to be structurally about as follows, it being understood that the proportions of the groups in these formulae are purely illustrative:

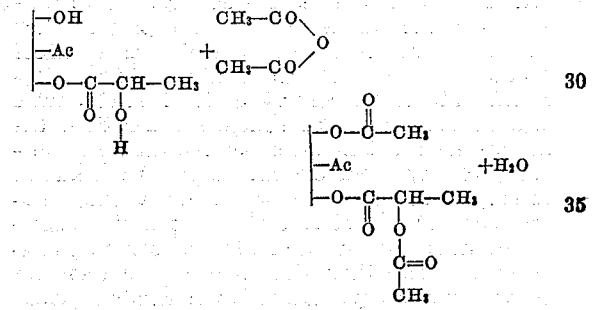

where is employed to represent a $C_6$ portion of the cellulose molecule and Ac is employed to represent acetyl groups. Obviously that the acid groups also attach on to the lactyl groups is mere theory and it is to be understood that even if that theory should prove false (which is unlikely) such a proof would not nullify the value of the applicants' process.

Analyses were run of various esters prepared by our invention and these results seem to indicate that such is the case. For example in the case of the acetate of cellulose acetate lactate, this ester had an apparent acetyl content of 44.7%. If only all the free hydroxyls on the cellulose were acetylated the apparent acetyl value would be 42.9% but if all the hydroxyls on the lactyl as well as those on the cellulose are acetylated the apparent acetyl content should be 46.1%. It would therefore appear that at least a portion of the hydroxyls of the lactyl groups were acetylated.

The propionate of cellulose acetate lactate prepared according to our invention had an apparent acetyl content of 41.7%. If only the free hydroxyl groups on the cellulose were esterified, the resulting ester would have an apparent acetyl value of 39.5%, however if the hydroxyls on the lactyl groups as well as those on the cellulose were esterified the apparent acetyl value would be 41.9% which corresponds closely to the observed value.

The succinate of cellulose acetate lactate prepared by the present invention was directly titrated with alkali in pyridine solution and was found to contain approximately 50.8% of succinyl. This was calculated assuming that only one carboxyl of each succinic acid molecule reacted with a hydroxyl group leaving the other carboxyl group free for titration. Obviously if both carboxyls were esterified titration with alkali would give no results. It may be calculated that if only the hydroxyls on the cellulose portion were esterified a succinyl content of 46.3% would be obtained. However, if the hydroxyls on the lactyl as well as those on the cellulose are esterified the succinyl content would be 51.2% which figure corresponds fairly closely with the observed percentage in the ester prepared. The results in the case of all of the esters for which calculations were made seem to indicate that the hydroxyls of the lactyl groups are at least partially esterified.

The esters prepared according to our invention may of course be employed in the usual capacities for which cellulose esters are employed such as sheeting, filaments, artificial leather, lacquer etc. Some of these esters also will be adapted to use for special purposes, for example the solubilities of cellulose acetate lactate phthalate and cellulose acetate lactate succinate in mild aqueous alkalies adapt these esters for use as anti-halation backing on photographic film as they can be easily removed therefrom in an alkaline bath upon or coincident to development of the film after it has been exposed.

Various modifications of the present process by those skilled in the art are also to be understood as being within the scope of the present invention.

We claim as our invention:

1. The process of preparing a mixed ester of cellulose which comprises submitting a cellulose ester containing a fatty acid radical, an alpha-hydroxy acid radical and a free and esterifiable hydroxyl group to the action of a dicarboxylic acid anhydride and a tertiary organic base.

2. The process of preparing a mixed ester of cellulose which comprises reacting upon a cellulose ester containing a fatty acid radical, an alpha-hydroxy acid radical, and a free and esterifiable hydroxyl group to the action of phthalic anhydride and a tertiary organic base.

3. The process of preparing a mixed ester of cellulose which comprises reacting upon a cellulose acetate lactate containing a free and esterifiable hydroxyl group with phthalic anhydride and pyridine.

WILLIAM O. KENYON.
RUSSEL H. VAN DYKE.